March 3, 1970
L. F. SCHMID
3,498,417
LOCKING BRAKE FOR THE POWER TRAIN OF AN
AUTOMOTIVE VEHICLE
Filed Feb. 12, 1968
3 Sheets-Sheet 1
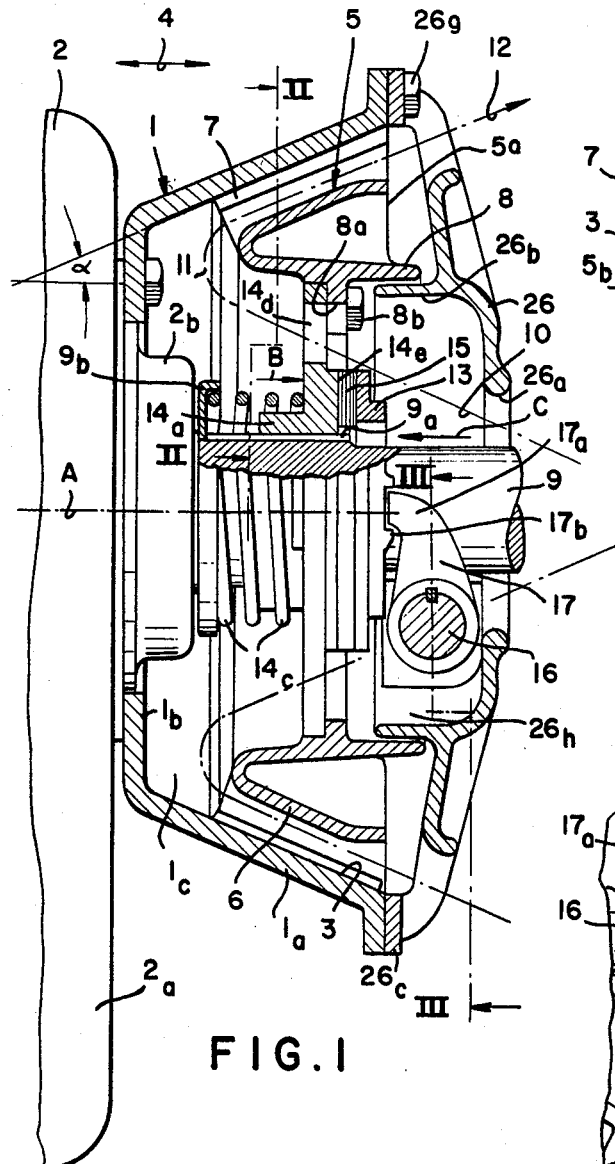
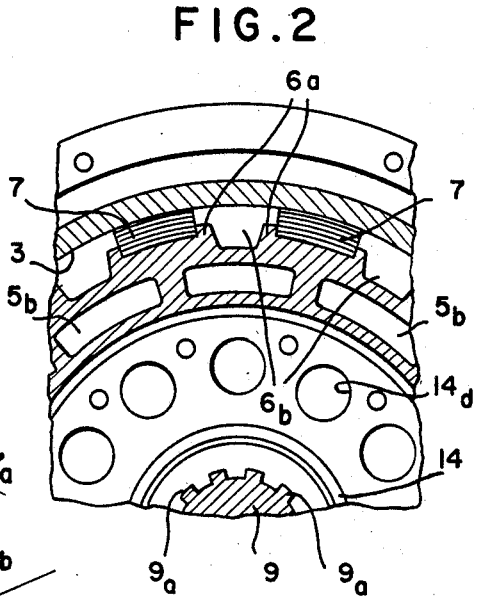
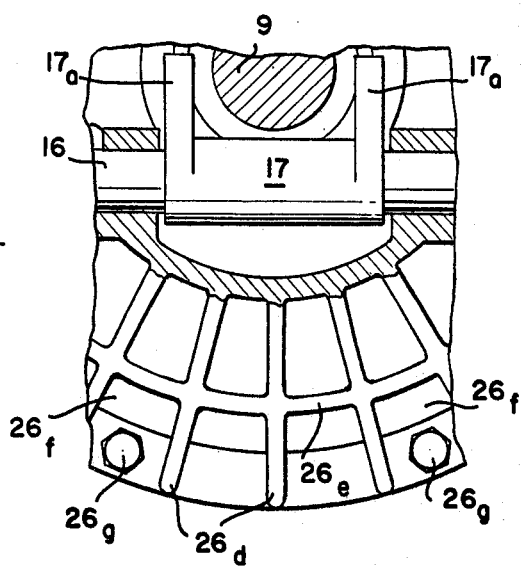
INVENTOR.
LEOPOLD F. SCHMID
BY
*Attorney*
ATTORNEY March 3, 1970
L. F. SCHMID
3,498,417
LOCKING BRAKE FOR THE POWER TRAIN OF AN
AUTOMOTIVE VEHICLE
Filed Feb. 12, 1968
3 Sheets-Sheet 2
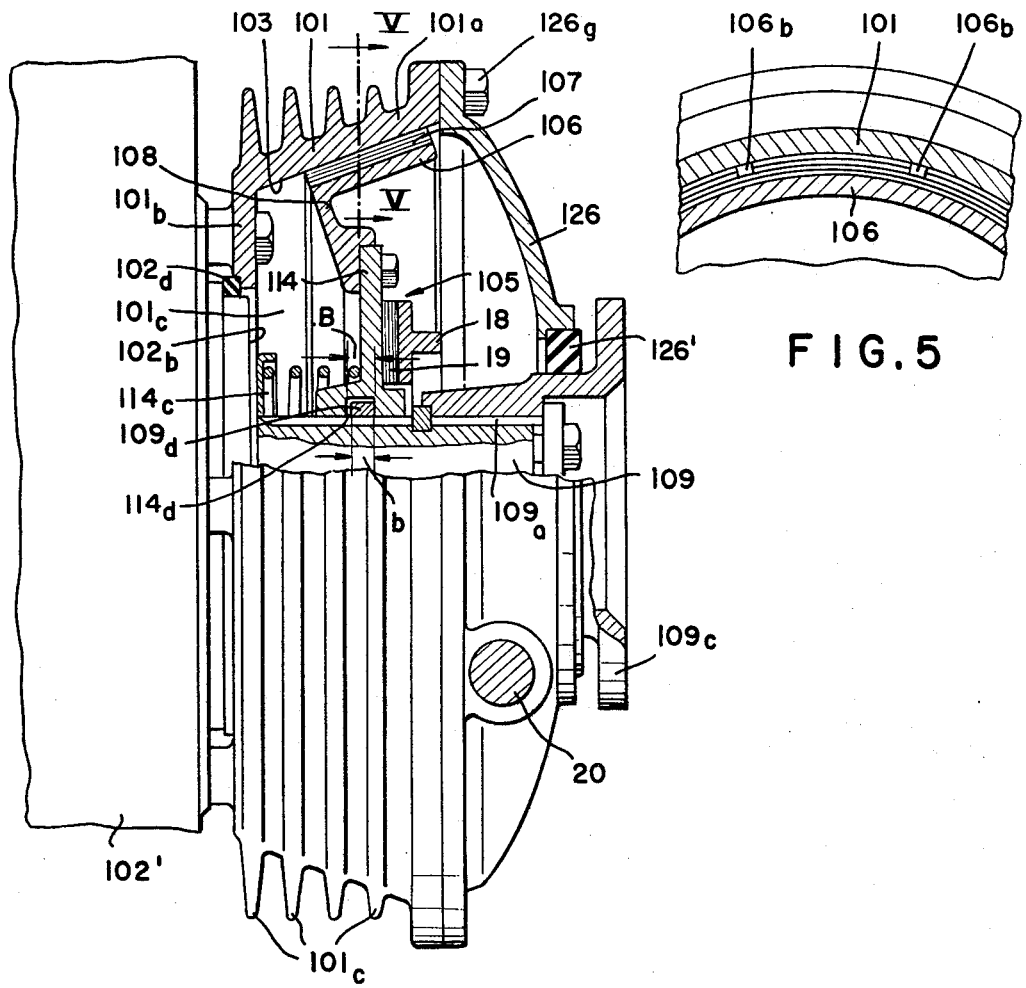
FIG.4
FIG.5
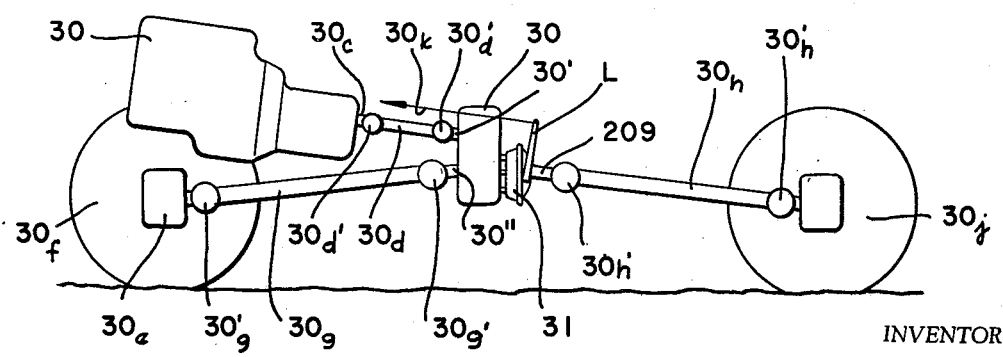
FIG.6A
INVENTOR.
LEOPOLD F. SCHMID
BY
*Attorney*
ATTORNEY INVENTOR.
LEOPOLD F. SCHMID
BY
*Attorney*
ATTORNEY

United States Patent Office 3,498,417
Patented Mar. 3, 1970

3,498,417
LOCKING BRAKE FOR THE POWER TRAIN OF AN AUTOMOTIVE VEHICLE
Leopold Franz Schmid, Stuttgart, Germany, assignor to Alfred Teves G.m.b.H., Frankfurt am Main, Germany, a corporation of Germany
Filed Feb. 12, 1968, Ser. No. 704,694
Claims priority, application Germany, Feb. 15, 1967, T 33,206
Int. Cl. F16d *13/24, 55/00*
U.S. Cl. 188—72         4 Claims

ABSTRACT OF THE DISCLOSURE

A mechanically operable brake for the drive train of an automotive vehicle having a housing or structure and a shaft constituting part of the drive chain, and extending from the housing, the brake being formed with a frustoconical drum mounted upon the housing around the shaft and diverging conically from the housing, and a rotor keyed to the shaft and axially shiftable therealong while having a frustoconical rim of a conicity identical to the drum for engagement therewith to brake rotation of the shaft relative to the drum, the drum being closed by a cover which preferably is sealed against entry of contaminants and/or permits the rotor to act as a blower for cooling of the brake surfaces. The frustoconical rotor flange is formed with a friction lining engageable with the inner surface of the drum.

---

My present invention relates to a mechanically operable locking, parking or emergency brake for an automotive vehicle and, more particularly, to a manually operable brake system effective to block rotation in the power train.

In my copending application Ser. No. 700,249 filed Jan. 24, 1968, I have described and claimed a mechanically operable emergency brake system or parking brake for an automotive vehicle which is protected against dirt, moisture and other contaminants by being housed in a differential of the vehicle. This brake constitutes, in effect, a system for limiting rotation of the driven-wheel axles which are connected in the power train extending from the transmission of the engine to a torque-splitting gear arrangement (when one or more sets of driven wheels are provided) to the differential or differentials and thence to the wheels via the driven axles. It may be noted that, in general terms, the manually operable brakes (i.e. brake devices controllable by a lever, pedal or handle from a location in the region of the driver's seat) can be classified in two categories. A first involves the locking of one or more wheels by the usual wheel-brake mechanisms via mechanical devices mounted on the hydraulic-brake housing or auxiliary toggle linkages, levers, or the like, designed to apply respective brakeshoes to the disk independently of the hydraulic wheel brake system. Mechanically operable brakes of the second type involve restricted rotation of one or more members in the power train. Such brakes may be transmission brakes, differential brakes or brakes associated with other gearing. In conventional transmission brakes, a band may engage a cylindrical surface rotatably entrained by the power shaft at the output side of the transmission to restrict rotation of the power shaft relative to a housing structure formed on or in the transmission housing. Other arrangements use disk-like brakeshoes which are applied axially to a ring carried by the shaft. For the most part, such arrangements are relatively massive and occupy large volumes.

It is, therefore, an important object of the present invention to provide an improved locking, parking or emergency brake system for the drive train of an automotive vehicle wherein the aforementioned disadvantages are avoided and which is more compact, more reliable and of simpler construction than prior drive train brakes.

This object and others, which will become apparent hereinafter, are obtainable with a brake system having a generally frustoconical brake drum affixed to the housing of the differential, transmission or torque-dividing gearing and divering frustoconically from the housing while surrounding the shaft to be braked; within this housing, I provide an axially shiftable brake member whose frustoconical outer periphery is complementary and parallel to the frustoconical wall of the housing and carriers a brake lining frictionally engageable with the inner frustoconical surface of the drum when the brakeshoe is displaced axially by a manually controlled lever. The brakeshoe thus constitutes a counter member working opposite and juxtaposed with the brake drum and coupled with the shaft of the latter. The rotor or disk, which rotates with the shaft, is advantageously formed as a blower rotor which induces a flow of air inwardly adjacent a central zone of the rotor and forces the cooling air through the interior of the drum around a deflector lying generally parallel to the drum and thence past the braking surfaces to cool the latter. The rotor structure may be analogous to that of a centrifugal blower.

According to another feature of this invention, the rotor member of the brake comprises an axially shiftable disk or wheel within the drum beyond which the annular outer wall of the drum extends, the disk being formed with a frustoconical surface with a conicity approximating that of the inner wall of the drum and carrying the friction lining. The arrangement thus formed has a significant advantage over earlier systems in that it allows the brake to be relatively compact and also permits the braking surface to be of relatively large area in relatively small volumes. The centrifugal blower arrangement of the rotor also provides for an effective cooling of the braking surfaces without additional means or complicated brake construction. It has been found to be especially desirable to provide means for closing the drum against entry of contaminants and moisture. To this end, the drum is provided with a cover through which the drive shaft of the rotor passes while the rotor itself is turned toward the wall of the transmission or differential upon which the brake is mounted to form a space in which the restoring springs or the like may be provided. When the housing is sealed against entry of contaminants, the brake is of particular suitability for use in military vehicles or the like, e.g. in amphibious trucks which may pass through shallow streams and along wet road surfaces.

The above and other objects, features and advantages of the present invention will become more readily apparent from the following description, reference being made to the accompanying drawing in which:

FIG. 1 is an axial cross-sectional view through a brake embodying the present invention;

FIG. 2 is a cross-sectional view taken along the line II—II of FIG. 1;

FIG. 3 is a cross-sectional view taken along the line III—III of FIG. 1;

FIG. 4 is a fragmentary cross-sectional view showing another brake embodying the invention;

FIG. 5 is a cross-sectional view taken along the line V—V of FIG. 4; and

FIG. 6A–FIG. 6D show various arrangements of the brake housing of FIGS. 1–5 in different vehicle systems.

Figure 6B:
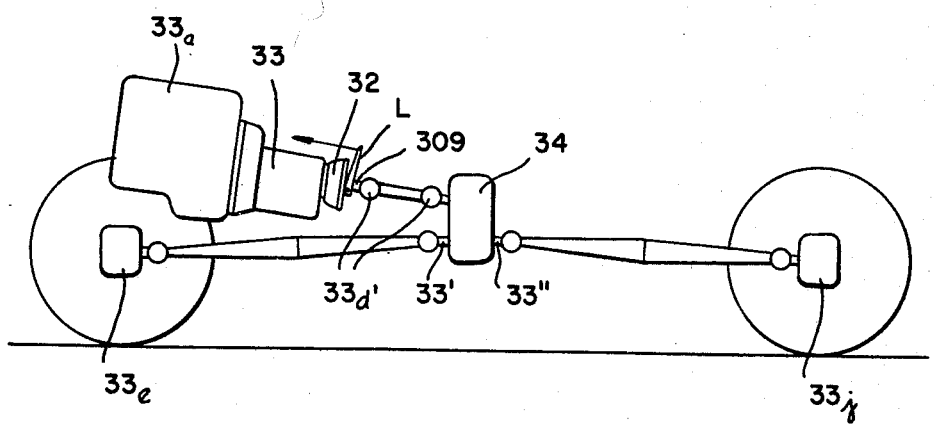

In FIGS. 1–3, I show an emergency, locking or parking brake, manually operable from the region of the driver's seat of the vehicle and adapted to be incorporated in any of the systems of FIGS. 6A–6D.

This brake comprises a frustoconical brake drum or housing 1 whose frustoconical walls 1a converge in the direction of the axis A of the system and whose annular inwardly turned base flange 1b is affixed to a vertical wall 2a of a transmission or differential housing 2. The latter is formed with a boss 2b projecting axially into the interior 1c of the drum and forming a bearing for a shaft 9 which constitutes part of the drive train and preferably is provided with a ball at a location beyond the housing 1. The half angle α of the cone should range between about 20° and 70° but preferably is of the order of 30°. The inner surface 3 of the frustoconical housing 1 forms the stationary braking member for the system and cooperates with a rotor (rotary brake member) 5 whose frustoconical flange 6 is held rigid with an axially extending deflecting flange 8 integral and unitarily formed therewith.

Between the annular flanges 6 and 8, radial webs 5a extend at angularly equispaced intervals to form compartments 5b between these webs to increase the cooling surface and heat-radiating capacity of the unit. Flange 6 is generally frusto-conical and thus parallels the frustoconical surface 3 with the half angle α mentioned above. A multiplicity of brake pads 7 (FIGS. 1 and 2) are partly recessed in pedestals 6a formed in angularly equispaced relationship about the flange 6 and projecting in the direction of the surface 3 while being juxtaposed therewith. The brake pads or shoes 7 are composed of a material having a high coefficient of sliding friction, reduced wearability, etc. Between the pedestals 6a, there are formed angularly equispaced channels 6b through which air is induced to flow as represented by the dot-dash arrows 10, 11 and 12. From the generally cylindrical flange 8, a radial flange 8a extends inwardly and is connected by bolts 8b to a disk 14 forming a hub for the rotor 5. To this end, a cylindrical boss or hub 14a of the disk is internally grooved and receives the splines 9a of the shaft 9. Thus, members 5 and 14 are axially shiftable (arrow 4) by control means which will be described in greater detail hereinafter. Surrounding this boss 14a and centered thereby, is a coil spring 14c which urges the hub 14a in the direction of arrow B, the spring reacting against a seat 9b carried by the shaft.

As indicated earlier, members 5 and 14, constituting the rotor, form a centrifugal blower in which the pedestals 6a and the brake lining 7 form vanes which displace air rapidly through the channel 6b as shown by arrow 12. Air is drawn into the chamber 1c through an opening 26a in a cover 26 having a cylindrical portion 26b fitting within the axial overhang of sleeve 8 so that a labyrinth-type seal is constituted between the cover 26 and the rotor. An annular rim 26c of this cover is connected with the inner portions 26a and 26b by a number of ribs 26d and 26e which define between them the outwardly turned openings 26f through which the cooling air emerges. Bolts 26q (FIGS. 1 and 3) secure the cover 26 to the broad end of the frustoconical housing 1. Sleeve 26b extends parallel to the shaft 9 to define therewith a chamber 26h communicating via axial bores 8c and 14d in the rotor 5 to draw air into the chamber 26h and then permitting the flow through the openings 8c and 14d. The flange 8, however, approaches the rear wall 1b of the housing, thereby forming a deflector for the air stream which bends around this deflector (arrow 11) to flow outwardly through channel 6b (arrow 12). The actuating mechanism for this brake comprises a pressure ring 13 which is nonrotatable but is axially shiftable (arrow C) by a pair of arms 17a carried by a lever 17 which is keyed to a shaft 16 extending perpendicularly (preferably horizontally) to axis A of shaft 9. Shaft 16 is journaled in the compartment 26h of cover plate 26 and is rotatable by a lever (e.g. the lever L or L' of FIG. 6A or 6D) to rotate the arms 17a in the counterclockwise direction (FIG. 1) and drive the ring 13 against the hub disk 14. Arms 17a have their free extremities received in diametrically opposite recesses 17b extending parallel to shaft 16 and transversely to axis A, thereby preventing rotation of disk 13. The latter also carries an annular friction lining 15 which confronts a smooth surface 14e of this disk.

Upon rotation of the arm 17a in the counterclockwise sense, therefore, the ring 13 and its lining 15 frictionally engages hub disk 14 to provide an initial frictional force limiting rotation of the rotor 5. Continued axial displacement of ring 13 overcomes the spring 14c to shift the rotor 5 in the direction of its convergence and brings the brake pads 7 into engagement with the frustoconical surface 3 of the disk. This arrangement of pressure ring, rotor and drum acts in the manner of a disk brake although larger braking surfaces can be obtained in smaller spaces. Upon release of the lever L or L', spring 14c suffices to urge the complementarily engageable frustoconical brake portions apart.

It should be noted that the housing 2 may be any gear-containing housing commonly used in the power train of an automotive vehicle and that the brake need not be provided along a shaft used to transmit power elsewhere, but can cooperate with specially provided shaft. Thus a normal power train comprises an engine, a speed-reducing transmission and, frequently, a differential, and a torque-splitting gear arrangement all of which have housings and shafts constituting part of the power train. The brake housing can be mounted on any of these housings or structures.

In FIGS. 4 and 5, I show a modification of this invention in which the drum 101 is formed with a multiplicity of annular, radially extending ribs 101c which facilitate the dissipation of heat from the braking face 103 of the drum where the rotor does not constitute a blower. In this embodiment, the frustoconical wall 101a of the drum is connected with a cover 126 by bolts 126g and is formed with an inwardly extending annular flange 101b which surrounds the boss 102b of the housing 102. A sealing ring 102d is disposed between the flange 101b and the boss 102b to prevent leakage of contaminants into the chamber 101c along the rear wall of the housing 101. The rotor of this system is represented at 105 and comprises a frustoconical rim 106 along which a brake lining 107 is formed continuously. At intervals, the lining 107 is provided with grooves 106b open in the direction of the braking surface 103 to facilitate the clearing of the lining from oil or the like which may form thereon.

The conicity of flange 106 and its lining 107 corresponds to that of the surface 103. An inwardly extending flange 108 of the rotor is affixed to a hub 114 which complementarily fits over a splined portion 109a of the shaft 109. The hub 114 is constituted as a disk, e.g. analogous to the disk of a disk brake, which is axially shiftable against a spring 114c seated against a ring 109b carried by the shaft 109. The cover 126 is formed with a seal 126' through which the flange sleeve 109c extends from connection to some other portions of the drive train, e.g. a universal joint. The actuating means for the brake of FIGS. 4 and 5 comprises a pressure ring 18 carrying a brake lining 19 juxtaposed with the hub 114 and axially shiftable upon rotation of the saft 20 in the cover 126 by a fork of the type shown at 17, 17a in FIGS. 1 and 3. The ring 18 is axially shiftable to bring the brake lining 19 into engagement with the ring 114. The hub 114 is formed with an inwardly open annular groove 114d whose axial width B is larger than the width b of an abutment ring 109d locked onto the shaft 109 and constituting a lost-motion wear adjustment means. The play (B−b) constitutes the play of the brake. Ring 109d is split and thus engages the shaft 109 with inwardly directed frictional force so that, upon wear of the brake lining 107, ring 109d is shifted axially on the shaft 109 until the lining again contacts surface 103 by the axial force of the ring 18. At this point, the rotation of shaft 109 is restricted by frictional engagement of lining 107 with the surface 103. When the pressure ring 18 is released, spring 114c displaces the rotor 105 to the right through the brake play (B−b) as described.

The brakes of FIGS. 1–5 have been found to be particularly desirable for use in military amphibious vehicles and other vehicles exposed to rigorous environments.

In FIG. 6A I show an arrangement in which the brake of FIGS. 1–3 or 4 and 5, represented at 31, is provided with a lever L and is mounted on the rear wall of a torque-splitting transmission 30. The power train of this vehicle comprises an engine 30a whose transmission 30b has an output shaft 30c connected via a drive shaft 30d and a pair of universal joints 30d' with the input shaft 30' of the torque-splitting transmission 30. One output 30" of this transmission is connected to the differential 30e of the driven front wheels 30f via a power shaft 30g and the universal joints 30g'. The other output shaft, represented at 209, passes through the brake 31 and is connected via a power shaft 30g and a pair of universal joints 30g' with the rear-wheel differential 30j. A Bowden cable, represented at 30k connects the actuating lever L with a lever disposed in the region of the driver's seat of the vehicle for manual or foot operation by the driver. In the system of FIG. 6B the brake 32 is provided along the output shaft 309 of a transmission 33 connected to the engine 33a. The brake 32 is thus secured to the transmission or engine housing directly. From the brake 32 a Bowden line represented at 32k extends to operate the control lever; the power train includes a shaft 33d and a pair of universal joints 33d' to the torque-distributing transmission 30. The output shafts 33' and 33" extend from the torque-distributing transmission 34 to the differentials 33e and 33j as previously described.

Figure 6D:
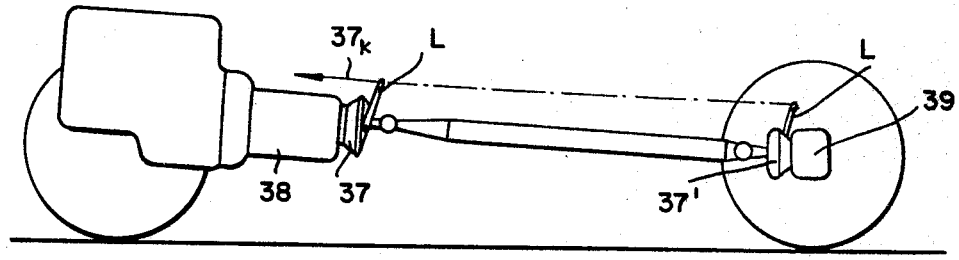
Figure 6C:
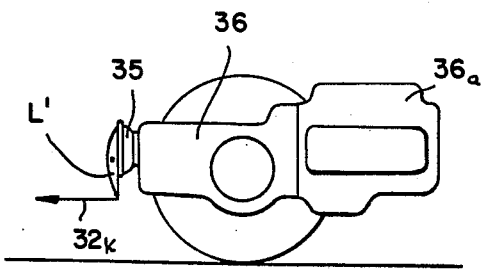

In FIG. 6C, I show a system in which the engine 36a is connected to the speed-changing transmission 36 and the latter drives the wheel directly, an auxiliary shaft being led from the transmission to the brake 35 (FIGS. 1–5) whose lever L' is controlled by the Bowden line 32k. This system is particularly suitable when a rear-wheel drive is employed with a rear engine.

FIG. 6D represents a system in which a pair of brakes 37, 37' of the type illustrated in FIGS. 1–5, are mounted upon the transmission housing 38 and the rear-wheel differential housing 39 with the levers L being actuated by a common Bowden cable 37k.

The invention described and illustrated is believed to admit of many modifications within the ability of persons skilled in the art.

I claim:

1. A brake for a power train of an automotive vehicle having a structure provided with a shaft constituting part of the power train and extending from said structure, said brake comprising:

a nonrotatable annular housing mounted on said structure and surrounding said shaft, said housing having a frustoconical drum with an interior frustoconical surface converging axially in one direction, and a cover spanning the wide end of said drum for closing same;

an axially shiftable rotor in said housing splined to said shaft and rotatably entrained therewith while being axially shiftable relatively to said housing, said rotor being coaxial with said housing and comprising a hub engaging said shaft, generally planar annular web substantially perpendicular to said shaft and connected to said hub, and a frustoconical rim fixed to said web and having a frustoconical outer braking surface of the same conicity and direction of convergence as said interior surface of said drum, said web having a generally flat annular brake face turned in the opposite axial direction from the direction of convergence of said surfaces;

a first brake lining circumferentially distributed about one of said surfaces for frictional engagement with the other of said surfaces upon axial displacement of said rotor in the direction of convergence of said surfaces;

a nonrotatable axially displaceable disk-brake ring surrounding said shaft in said housing and having a generally flat annular brake face confronting said brake face of said web, and a pair of recesses facing away from said brake face of said web and on diametrically opposite sides of said shaft;

a second brake lining on one of said faces for frictional engagement with the other of said faces upon axial displacement of said ring in said direction of convergence;

a bifurcated yoke-shaped eccentric member straddling said shaft and having a pair of axially projecting formations received in said recesses of said ring for axially shifting same in said direction of convergence while retaining said ring against rotation with said shaft;

a spring in said housing bearing on said rotor in said opposite direction; and a second shaft extending perpendicular to the first-mentioned shaft and pivotally mounted in said housing and fixed to said yoke-shaped eccentric member for pivotally shifting same.

2. The brake defined in claim 1 wherein said frustoconical surface of said rotor is provided with said first brake lining and said first brake lining is subdivided angularly into equispaced brake pads defining channels between them, said rotor being formed between said pads with throughgoing channels opening into the interior of said housing, said cover being provided with openings communicating with said channels whereby rotation of said rotor induces air flow through said channels to dissipate heat from said surfaces.

3. The brake defined in claim 1 wherein said ring is formed with said second brake lining.

4. The brake defined in claim 1, further comprising a friction ring hugging said first shaft, said hub being provided with an internal groove receiving said friction ring with axial play for adjusting the position of said rotor upon wear of said first brake lining.

References Cited

UNITED STATES PATENTS

| 1,781,443 | 11/1930 | Curtis | 188—72 |
| 2,757,761 | 8/1956 | Milan | 188—72 |
| 2,966,237 | 12/1960 | Galleher | 188—71 |
| 3,208,557 | 9/1965 | Burnett | 188—71 X |
| 3,221,854 | 12/1965 | Jaeschke et al. | |
| 2,393,398 | 1/1946 | Nabstedt | 192—70.15 X |

FOREIGN PATENTS

| 39,892 | 6/1965 | Germany. |
| 1,202,658 | 10/1965 | Germany. |

GEORGE E. A. HALVOSA, Primary Examiner

U.S. Cl. X.R.

188—80, 84, 196; 192—66, 70.15, 70.24, 70.25